United States Patent [19]
Parker

[11] 3,754,748
[45] Aug. 28, 1973

[54] APPARATUS FOR SUPPORTING TIRE RIM FOR ROTATION IN PREDETERMINED PLANE

[76] Inventor: Hugh M. Parker, 718 Cherokee St., Talladega, Ala.

[22] Filed: June 14, 1971

[21] Appl. No.: 152,855

Related U.S. Application Data

[63] Continuation-in-part of Ser. No. 821,920, May 5, 1969, Pat. No. 3,589,705.

[52] U.S. Cl............... 269/20, 144/288 A, 269/22, 269/48.1, 157/1.1, 157/13
[51] Int. Cl....... B60b 29/00, B25h 5/00, B23q 3/08
[58] Field of Search.................. 144/288 A, 288 R; 269/48.1, 20, 22; 157/1.1, 13

[56] References Cited
UNITED STATES PATENTS

| | | | |
|---|---|---|---|
| 3,589,705 | 6/1971 | Parker | 144/288 A X |
| 2,937,676 | 5/1960 | Smyser | 144/288 A |
| 2,873,777 | 2/1959 | Thostenson | 144/288 A |
| 2,448,414 | 8/1948 | Branick | 144/288 A |

*Primary Examiner*—Donald R. Schran
*Attorney*—Hugh P. Cater and Woodford R. Thompson, Jr.

[57] ABSTRACT

Apparatus supporting tire rim for rotation in a predetermined plane including a supporting spindle extending perpendicular to said predetermined plane. A support member is operatively connected to and supported from spindle for rotation about the axis of rotation of the spindle. Angularly spaced inflatable members are carried by the support members with outer surfaces thereof engagable with rim, upon inflation of inflatable members.

7 Claims, 10 Drawing Figures

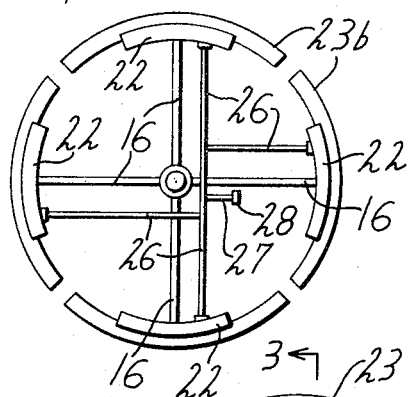
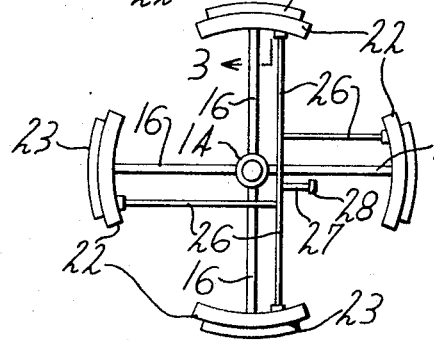
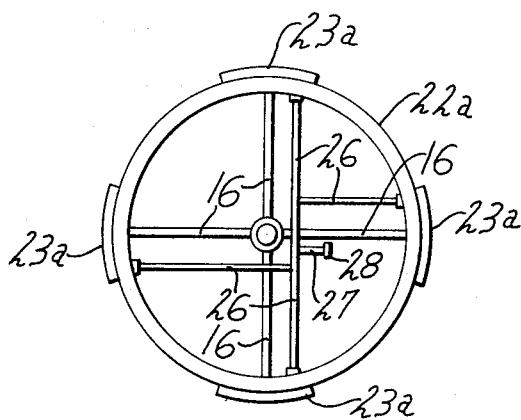
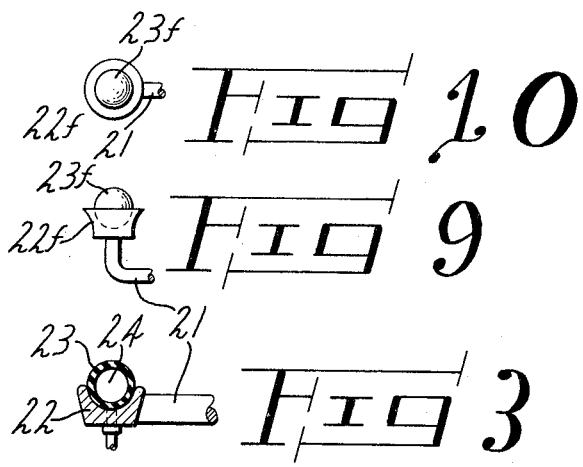
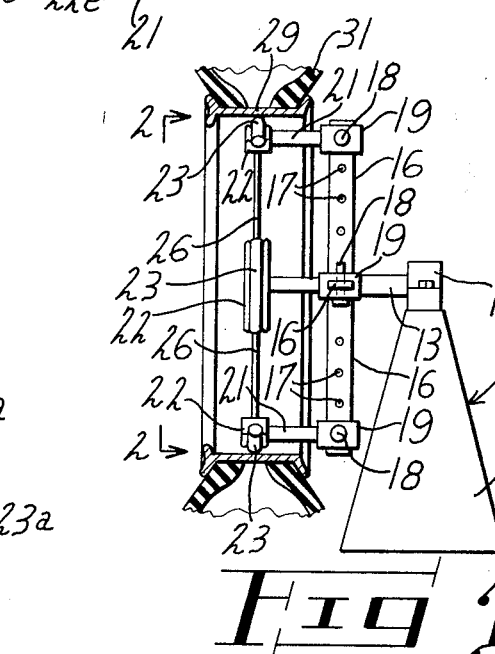
INVENTOR.
Hugh M. Parker
BY
Jennings, Carter & Thompson
Attorneys

APPARATUS FOR SUPPORTING TIRE RIM FOR ROTATION IN PREDETERMINED PLANE

CROSS REFERENCE TO RELATED APPLICATION

This application is a continuation-in-part of my co-pending application Ser. No. 821,920 filed May 5, 1969, now U.S. Pat. No. 3,589,705, and entitled "APPARATUS FOR SUPPORTING RIM MOUNTED TIRE FOR ROTATION IN PREDETERMINED PLANE".

BACKGROUND OF THE INVENTION

This invention relates to apparatus for supporting a tire rim for rotation in a predetermined plane and more particularly to apparatus for supporting a vehicle tire mounted on a rim for balancing, buffing and the like.

Difficulties have heretofore been encountered in balancing tires for heavy trucks and the like due to the fact that the tires are mounted on cylindrical rims which are detachably connected to the spokes of the vehicle whereby upon removing the tire and its rim, there is no means for supporting the wheel about its axis of rotation. Mechanical devices heretofore proposed for attachment to the rim to provide a central axis about which the tire is rotated are very difficult to install whereby the tire and its rim will rotate in a predetermined plane perpendicular to the axis of rotation. Accordingly, the cost of balancing or buffing heavy, rim mounted truck tires is very expensive and a considerable amount of time is involved in balancing such tires.

BRIEF SUMMARY OF THE INVENTION

In accordance with my present invention, I provide a supporting spindle which extends perpendicular to a predetermined plane. A support member is operatively connected to and supported from the spindle for rotation about the axis of the rotation of the spindle and angularly spaced inflatable members are carried by the support member with the outer surfaces thereof engagable with the rim upon inflation of the inflatable members.

Apparatus embodying features of my invention is illustrated in the accompanying drawing, forming a part of this application, in which:

FIG. 1 is an elevational view of the apparatus showing in section a rim mounted vehicle tire mounted thereon;

FIG. 2 is a view taken generally along the line 2—2 of FIG. 1, the rim and vehicle tire being omitted, for the sake of clarity;

FIG. 3 is an enlarged, fragmental, sectional view taken generally along the line 3—3 of FIG. 2;

FIG. 4 is an elevational view corresponding to FIG. 2 but showing a modified form of my invention;

FIG. 5 is an elevational view corresponding to FIGS. 2 and 4 showing a further modified form of my invention;

FIG. 6 is a fragmental, sectional view showing a further modified form of my invention;

FIG. 7 is a fragmental, sectional view showing a further modified form of my invention;

FIG. 8 is a fragmental, sectional view showing a still further modified form of my invention;

FIG. 9 is a fragmental view showing another form of my invention; and,

FIG. 10 is a top plan view of the apparatus shown in FIG. 9.

Referring now to the drawing for a better understanding of my invention, I show a supporting frame 10 which may be in the form of suitable A-frames 11 secured to each other to provide a sturdy supporting structure. Mounted on top of the supporting frame 10 is a bearing unit 12 for receiving the end of a spindle 13.

Mounted on the spindle 13 is a hub 14 having radially extending spoke-like members 16. The outer ends of the spoke-like members are provided with longitudinally spaced openings 17 for receiving locking pins 18 which pass through brackets 19 which are adapted for sliding movement along the spoke-like members 16, as shown in FIG. 1. Accordingly, the distance the support brackets 19 are positioned from the spindle 13 may be varied to accommodate rims of various diameters.

Projecting laterally from each support bracket 19 is a support arm 21 which carries an arcuate support member 22 adjacent the free end thereof, as shown in FIGS. 1 and 3. Secured to each of the arcuate support members 22 is an inflatable member 23 which is formed of a hollow, resilient material. Each end of each inflatable member 23 is closed by an end wall 24, as shown in FIG. 3.

Communicating with each inflatable member 23 is a flexible air supply conduit 26. As shown in FIG. 2, the air supply conduits 26 are all in communication with a common air supply conduit 27 whereby air under the same pressure is introduced into all of the inflatable members 23 upon introducing air into the air supply conduit 27. A conventional type valve stem 28 is provided at the end of the air supply conduit 27 for supplying air thereto.

To mount a rim mounted tire whereby it rotates with the inflatable members 23 in a plane perpendicular to the axis of the spindle 13, the rim, indicated at 29, carrying a conventional type pneumatic tire 31, is positioned around the outer surface of the inflatable members 23, as shown in FIG. 1. That is, the inflatable members 23 are each spaced an equal distance from the axis of rotation of the spindle 13 and engage the inner surface of the rim 29 whereby the rim and the tire 31 are concentric with the axis of rotation of the spindle 13. The inflatable members 23 are deflated at the time the rim 29 is positioned around the members 23 whereby upon introducing air into the valve stem 28, all of the inflatable members 23 expand to firmly secure the rim 29 to the outer surface of the inflatable members 23 whereby the tire 31 and its rim 29 rotate in a plane perpendicular to the axis of the spindle 13.

From the foregoing description, the operation of my improved apparatus shown in FIGS. 1 through 3 will be readily understood. The tire 31 and rim 29 are removed from the vehicle in the usual manner and are then inserted over the outer surfaces of the inflatable members 23 while the inflatable members are in collapsed position. The inflatable members 23 are aligned whereby the sides thereof are parallel to the sides of the rim 29 and air is then introduced into the inflatable members 23 whereupon they engage the inner surface of the rim 29 to thus firmly connect the rim to the arcuate inflatable members 23. Since the arcuate members 23 are each mounted concentric with the axis of rotation of the spindle 13 and rotate in a plane perpendicular to the axis of spindle 13, the parallel alignment of the sides of the inflatable members 23 with the sides of the rim 29 cause the rim 29 and the tire 31 supported thereby to also rotate in plane perpendicular to the axis of the spindle 13. With the tire 31 and the rim 29 thus mounted for rotation in a predetermined plane, the tire is then balanced by employing conventional type wheel balancing equipment, or the outer surface of the tire may be buffed whereby the outer surface is concentric with the axis of the spindle 13.

In FIG. 4 of the drawing, I show an arcuate member 22a which is in the form of a complete circle rather than being in the form of arcuate sections, as shown in FIG. 2. The arcuate member 22a supports inflatable members 23a, as described hereinabove. Also, air under pressure is supplied to the inflatable members 23a by air supply conduits 26 having an air supply conduit 27 and a valve stem 28. The operation of the apparatus shown in FIG. 4 is the same as the operation of the apparatus shown in FIGS. 1 through 3. However, by providing the arcuate members 22 and the expandable members 23 in the form of angularly spaced members and providing flexible air supply conduits 26, the arcuate members 22 and their supporting arms 21 may be moved inwardly and outwardly relative to the axis of rotation of the spindle 13 whereby the supporting brackets 19 may be supported at selected positions by pins 18 to accommodate rims 29 of various diameters.

In FIG. 5 of the drawing, I show another modified form of my invention in which the inflatable members are in the form of arcuate members 23b which are closely adjacent each other to provide a substantially continuous circle. Air under pressure is supplied to the arcuate, inflatable members 23b by flexible conduits 26 which are connected to a supply line 27 having a valve stem 28.

In FIG. 6 of the drawing, I show the lateral arm 21 as being connected to a support member 22c which is connected to an expandable member 23c which acts as a diaphram to move outwardly of the member 22c. The support member 22c is generally U-shaped, as viewed in cross section to provide a space for receiving air between the inner surface of the member 22c and the inner surface of the flexible, expandable member 23c. Accordingly, upon introducing air under pressure into the cavity defined between the members 22c and 23c, the expandable member 23c moves outwardly into engagement with the inner surface of the rim 29 in the identical manner as the apparatus described hereinabove. As shown in FIG. 6, the outer edge of the flexible member 23c overlaps and depends alongside the outer surface of the adjacent edges of the member 23c. The member 23c is bonded firmly to the member 22c to thus form a substantially integral member.

In FIG. 7 of the drawing, I show the lateral arm 21 as being secured to a support member 22d which is identical to support member 22c. A flexible, expandable diaphragm-like member 23d is secured to the open end of the member 22d, as shown whereby the member 23d extends inwardly of the edges of the member 22d. The operation of the apparatus shown in FIG. 7 is identical to the operation of the apparatus shown in FIG. 6.

In FIG. 8, I show another modified form of my invention in which the arm 21 is secured to a support member 22e which is attached to the ends of a diaphragm-like member 23e which is formed of an expandable material. Accordingly, the inflatable member 23e is formed substantially integrally with the support member 22e whereby the support member 22e forms the inner side of the inflatable member. The operation of the apparatus shown in FIG. 8 is identical to the operation of the apparatus as shown in FIGS. 6 and 7.

In FIGS. 9 and 10 I show a still further modified form of my invention in which the lateral arms 21 are each secured to a cup-like member 22f which is adapted to receive a resilient, inflatable ball-like member 23f. Since the member 23f is in the form of a sphere, its rounded, outer surface engages the inner surface of the rim 29 whereby angularly spaced points of contact are made between the inflatable members 23f and the rim 29 to thus support the rim and the tire 31, as described hereinabove.

From the foregoing, it will be seen that I have devised an improved apparatus for supporting a rim mounted tire for rotation in a predetermined plane. By providing inflatable members which engage the rim at angularly spaced positions, with the outer surfaces of the inflatable members being concentric with the axis of rotation of the spindle, the rim is supported for rotation in a predetermined plane perpendicular to the axis of rotation of the spindle. Also, by providing adjustable means for supporting the lateral arms 21, the apparatus is adapted for accommodating rims of various diameters. Furthermore, by providing apparatus which may be readily assembled and disassembled, with a minimum of time and effort, the rim supported tires can be quickly and accurately balanced, buffed or the like, thereby greatly reducing the overall cost of such operations.

While I have shown my invention in several forms, it will be obvious to those skilled in the art that it is not so limited, but is susceptible of various other changes and modifications without departing from the spirit thereof.

What I claim is:

1. The combination with apparatus for supporting a rigid rim for a rim mounted tire mounted for rotation in a predetermined plane,
    a. a spindle extending perpendicular to said predetermined plane,
    b. means supporting said spindle,
    c. at least one support member spaced outwardly from said spindle,
    d. means operatively connecting said spindle to said support member with said support member rotatable about the axis of said spindle and in said predetermined plane,
    e. angularly spaced, resilient, inflatable members carried by said support member and having outer deformable surfaces movable into engagement with the inner surface of said rigid rim, and
    f. means to inflate said inflatable members to secure said rim to said support member.

2. The combination with apparatus for supporting a rigid rim for a rim mounted tire as defined in claim 1 in which said support member comprises a plurality of arcuate sections spaced angularly from each other.

3. The combination with apparatus for supporting a rigid rim for a rim mounted tire as defined in claim 1 in which said inflatable members are arcuate in shape and define a substantially continuous arcuate member which surrounds said hub.

4. The combination with apparatus for supporting a rigid rim for a rim mounted tire as defined in claim 1 in which said inflatable members are spherical in shape.

5. The combination with apparatus for supporting a rigid rim for a rim mounted tire as defined in claim 1 in which said inflatable members are formed integrally with said support member whereby said support member forms the inner side of each inflatable member.

6. The combination with apparatus for supporting a rigid rim for a rim mounted tire as defined in claim 1 in which said inflatable members are connected to a common air supply conduit so that air under the same pressure is introduced into all of said inflatable members.

7. The combination with apparatus for supporting a rigid rim for a rim mounted tire as defined in claim 1 in which said means operatively connecting said spindle to said support member comprises:
   a. a radially extending member carried by said spindle, and
   b. adjustable means connecting said support member to said radially extending member at selected positions to vary the distance between said support member and said spindle.

* * * * *